US006738485B1

(12) United States Patent
Boesen

(10) Patent No.: US 6,738,485 B1
(45) Date of Patent: *May 18, 2004

(54) APPARATUS, METHOD AND SYSTEM FOR ULTRA SHORT RANGE COMMUNICATION

(76) Inventor: Peter V. Boesen, 4026 Beaver Ave., Des Moines, IA (US) 50301

(*) Notice: Subject to any disclaimer, the term of this patent is extended or adjusted under 35 U.S.C. 154(b) by 441 days.

This patent is subject to a terminal disclaimer.

(21) Appl. No.: 09/707,515

(22) Filed: Nov. 7, 2000

Related U.S. Application Data

(63) Continuation-in-part of application No. 09/587,743, filed on Jun. 5, 2000, now Pat. No. 6,408,081, which is a continuation of application No. 09/309,107, filed on May 10, 1999, now Pat. No. 6,094,492.

(51) Int. Cl.[7] ............................................... H04R 25/00
(52) U.S. Cl. ...................... 381/312; 381/326; 381/328; 381/330; 181/130; 181/135
(58) Field of Search ................. 381/110, 312, 381/314, 315, 316, 328, 330; 704/275; 455/66, 68, 69, 70, 90, 403, 550, 557, 563, 568, 569; 379/67.1, 88.01, 88.02, 90.01, 93.05, 93.07; 128/899; 600/300

(56) References Cited

U.S. PATENT DOCUMENTS

| | | |
|---|---|---|
| 2,517,181 A | 8/1950 | Davis |
| 4,150,262 A | 4/1979 | Ono |
| 4,334,315 A | 6/1982 | Ono et al. |
| 4,374,382 A | 2/1983 | Markowitz |
| 4,528,987 A | 7/1985 | Slocum |
| 4,588,867 A | 5/1986 | Konomi |
| 4,635,646 A | 1/1987 | Gilles et al. |
| 4,654,883 A | 3/1987 | Iwata |
| 4,670,798 A | 6/1987 | Campbell et al. |
| 4,672,976 A | 6/1987 | Kroll |
| 4,742,831 A | 5/1988 | Silvian |
| 4,773,427 A | 9/1988 | Inoue et al. |
| 4,777,961 A | 10/1988 | Saltzman |
| 4,791,673 A | 12/1988 | Schreiber |
| 4,791,933 A | 12/1988 | Asai et al. |
| 4,792,145 A | 12/1988 | Eisenberg et al. |
| 4,947,859 A | 8/1990 | Brewer et al. |
| 4,984,098 A | 1/1991 | Buntsis |

(List continued on next page.)

FOREIGN PATENT DOCUMENTS

| | | |
|---|---|---|
| EP | 0 683 621 A | 11/1995 |
| GB | 2 074 817 | 11/1981 |
| JP | 2000022670 A | 1/2000 |

OTHER PUBLICATIONS

Article entitled Agilent Technologies Announces Availability of Wireless Network Cap for Portable Patient Monitor, http://www.healthcare.agilent.com/press_releases/PRHS2920030.html.

Article entitled "Agilent Technologies Introduces New Telemon Patient Monitor," http://www.healthcare.agilent.com/press–releases/PRHS2920016.html.

(List continued on next page.)

*Primary Examiner*—Curtis Kuntz
*Assistant Examiner*—Brian Ensey
(74) *Attorney, Agent, or Firm*—McKee, Voorhees & Sease, P.L.C.

(57) ABSTRACT

A system for voice sound communicated control includes an earpiece adapted to be inserted into the external auditory canal of the user and having a bone conduction sensor being adapted to sense bone conductive vibrations in the external auditory canal and an air conduction sensor being adapted to sense air vibrations, a processor electrically connected to the bone conduction sensor and the air conduction sensor and adapted to provide a voice sound signal. A local unit can be controlled by the earpiece. The local unit includes a reciever, a speech processor, a control unit and a device, the functions of the device being controlled via voice sound information received from the earpiece.

49 Claims, 14 Drawing Sheets

U.S. PATENT DOCUMENTS

| | | | |
|---|---|---|---|
| 5,010,890 A | 4/1991 | Pfohl et al. | |
| 5,035,247 A | 7/1991 | Heimann | |
| 5,052,398 A | 10/1991 | Gober | |
| 5,191,602 A | 3/1993 | Regen et al. | |
| 5,201,007 A | 4/1993 | Ward et al. | |
| 5,280,524 A | 1/1994 | Norris | |
| 5,295,193 A | 3/1994 | Ono | |
| 5,298,692 A | 3/1994 | Ikeda et al. | |
| 5,365,937 A | 11/1994 | Reeves et al. | |
| 5,381,798 A | 1/1995 | Burrows | |
| 5,417,222 A | 5/1995 | Dempsey et al. | |
| 5,458,123 A | 10/1995 | Unger | |
| 5,492,129 A | 2/1996 | Greenberger | |
| 5,613,222 A | 3/1997 | Guenther | |
| 5,634,468 A | 6/1997 | Platt et al. | |
| 5,692,059 A | 11/1997 | Kruger | |
| 5,721,783 A * | 2/1998 | Anderson | 381/328 |
| 5,771,438 A | 6/1998 | Palermo et al. | |
| 5,933,506 A | 8/1999 | Aoki et al. | |
| 5,987,146 A | 11/1999 | Pluvinage et al. | |
| 6,009,336 A * | 12/1999 | Harris et al. | 455/566 |
| 6,021,207 A | 2/2000 | Puthuff et al. | |
| 6,094,492 A * | 7/2000 | Boesen | 381/312 |
| 6,112,103 A | 8/2000 | Puthuff | |
| 6,181,801 B1 | 1/2001 | Puthuff et al. | |

OTHER PUBLICATIONS

Article entitled "M3 and M4 Series Patient Monitors," http://www.healthcare.agilent.com/show_product.pl?/M3%20and%20M4%20Series%20Patient%20 Monitor.html.

Article entitled "What is a Wirless LAN?", 1998, Proxim, Inc.

Bluetooth Usage Model, http://www.bluetooth.com/bluetoothguide/models/ultimate.asp (visited Jun. 26, 2000).

Article entitled "Wireless Worries: Are Cell Phones a Danger to You and Your Children," May 26, 2000, http://more.abcnews.go.com/onair/2020/2020_000526_cellphones.html.

Air Magic Wireless Headset User Guide.

Article entitled "A One–Size Disposable Hearing Aid Is Introduced," by Wayne J. Staab, Walter Sjursen, David Preves & Tom Squeglia, pp. 36–41, The Hearing Journal, Apr. 2000, vol. 53, No. 4.

Article entitled "Brain cancer victim sues cell–phone providers," http://www.cnn.com/2000/TECH/computing/08/08/cellular.cancer.lawsuit.idg/index.html.

Article entitled "Report Urges Curbs on Mobile Phone Use," May 15, 2000, http://www.techweb.com/wire/story/TWB20000515S005.

Article entitled "Scientist link eye cancer to mobile phones," by Jonathan Leake, Jan. 14, 2001, http://www.Sunday–times.co.uk/news/pages/sti/2001/01/14/stinwenws01032.html.

Article entitled "The Hearing Review," Jan. 1999, vol. 3: Hearing in Noise (Supplement) pp. 1–62.

Article entitled "The latest on cell phone emissions".

Article entitled "U.S. Will Oversee Cell–Phone Safety Studies," Jun. 9, 2000, http://www.techweb.com/wire/story/reutrers/REU20000609S0003.

A New Level of Control for Faster, More Predictable Recovery, Aspect Medical Systems, as early as 1997.

Article entitled, "5th International Conference on Wearable Computers," by Rick Johnson, Pen Computing Magazine, Aug.

* cited by examiner

APPARATUS, METHOD AND SYSTEM FOR ULTRA SHORT RANGE COMMUNICATION

RELATED APPLICATIONS

This application is a continuation-in part to related co-pending applications: U.S application Ser. No. 09/587,743 filed on Jun. 5, 2000 now U.S. Pat. No. 6,408,081 which is a continuation of Ser. No. 09/309,107 filed May 10, 1999 now U.S. Pat. No. 6,094,492; U.S. application Ser. No. 09/607,305 filed on Jun. 30, 2000; U.S. application Ser. No. 09/570,758 filed on May 15, 2000; and U.S. application Ser. No. 09/560,205 filed on Apr. 28, 2000; U.S. application Ser. No. 09/640,230 filed on Aug. 16, 2000; U.S. application Ser. No. 09/619,233 filed on Jul. 19, 2000; U.S. application Ser. No. 09/416,168 filed on Oct. 11, 2000.

BACKGROUND OF THE INVENTION

1. Field of the Invention

This invention relates to an apparatus, method, and system for ultra short range communication of voice information. More particularly, this invention relates to an integrated system capable of receiving information, including, but not limited to voice sound information and providing actions based upon the particular information.

2. Problems in the Art

The present invention has various aspects and embodiments that relate to a number of different areas, and solves problems in these areas. The relationship between these different problems will become clear in the context of the present invention.

Wireless Communications

Wireless communications devices continue to proliferate in homes, offices, and other places. These devices include wireless networks, cell phones, remote controls, and numerous other devices. In the future, it is anticipated that even more wireless communication devices will be controlled through wireless communications. Wireless communications often involves the sending and receiving of electromagnetic waves as will be discussed later in greater detail.

Another type of wireless communication that has been used in short range communication is infrared. Infrared communications involves sending and receiving a beam of infrared light between a transmitter and receiver. This technology has been used in various remote controls such as television remotes, remote headphones, and remote mice for computers. Advantages of this type of wireless communication is that interference problems are avoided. One very significant disadvantage is that line-of-sight between the transmitter and the receiver is required. This is acceptable for some short range applications, but not all short range applications, as the line of sight may be blocked or alternatively, movement of a user carrying such a device may be restricted and thus this type of device would be inoperable or undesirable.

Electromagnetic Interference and Electromagnetic Radiation

This increase in wireless communication devices brings with it a number of problems. First, the more devices that use radio communications, the more likely it is that these devices will interfere with one another. This electromagnetic interference is expected to grow in the future due to the sheer number of wireless devices. As these communication devices increase in number, the available spectrum will become more congested and more electromagnetic interference problems will manifest. The problem of electromagnetic interference is well-documented and can have severe consequences. It can result in device misoperation and failure. Electromagnetic interference is especially problematic where proper device operation is critical, such as in hospitals, aircraft, and other environments. Thus, there is a need for a method which allows for devices to be placed in close proximity while preventing interference with one another.

Second, exposure to electromagnetic radiation has been linked with health problems. Electromagnetic fields have been found to be associated with various biological effects. This is a very serious problem that has largely been ignored in the field of wireless communications. The current trends in wireless communications demonstrate that this crucial problem is not being addressed. For example, one current trend in communications is toward utilizing signals with greater power density so that the signal radiates a greater distance and has an improved signal-to-noise ratio.

There is a concern that this increase in radiation will lead to even greater health problems. This is particularly true where earpieces are used. Increased radiation will be absorbed by the head due to the proximity of the earpiece and the prolonged use of the earpiece. The proximity of the device and long periods of use increase the human body's absorption of radiation. There is a further concern that as these devices proliferate even more, greater and greater levels of radiation can result in increased adverse bioeffects. Thus, there is a need in the art for a method which reduces radiation exposure.

Electronic Devices

Another problem relates to increased availability of electronic devices, including personal electronic devices, and increased functionality associated with these devices. Numerous devices now have digital controls for increased functionality. Thus, these devices also have displays and other input/output components. As the functionality of devices increases, the complexity of using the device also increases. This can result in a person spending an increased amount of time learning or relearning how to operate such a device.

Also, such devices often involve hands-intensive operations as well. This hands-intensive operation make current electronic devices unsuitable in many circumstances. For example, driving a car while concurrently using a handheld device has led to multiple car accidents. While a number of devices have attempted to address the problem of hands-intensive operation, this problem is not yet fully resolved. For example, wired systems are inconvenient, as the a vehicle driver may become entangled in the wire. In other contexts, wired systems are also inconvenient as wired systems restrict movement. Other attempts to solve this problem include speakerphone systems. Speakerphone systems are prone to ambient and environmental noise or interference. Thus there is a need for a more efficient and convenient means of operating devices.

Wireless Networks

Related to the proliferation of wireless devices is the concept of wireless networks. Wireless networks provide communication between a number of different devices.

One technology currently in use for electromagnetic wireless communications is the BLUETOOTH™ standard. Named after a Danish king, this is a standard and specification for short-range radio links that can be used to connect a variety of devices, including phones, computers, and other portable devices in order to remove the need for cables. It is believed that there will be a great deal of growth in the number of devices that support this or similar communication standards. Despite any advantages of BLUETOOTH™ networks, problems remain. These problems include radiation exposure and battery life limitations.

Another wireless network standard is the IEEE 802.11 standard for wireless ethernet. This standard and its variations provide for wireless ethernet transmissions. Yet another wireless network standard is the HomeRF shared wireless access protocol used to permit wireless sharing on Internet access, and computer peripherals. This standard may operate with a transmission power of 100 mW and operates at a 2.4 GHz frequency range for distances of up to approximately 50 meters.

There is a need for wireless networks that can be easily and conveniently created. There is a further need for wireless networks that have low power requirements and low radiation emissions.

Network Appliances

Recent attempts have been made to provide remote control of appliances and their devices over a network such as the Internet. This permits remote control to be provided to devices such as Internet appliances or smart appliances. This allows particular devices to be controlled from anywhere, provided that there is an Internet connection to the remote control unit and to the device. One problem with this approach is the accompanying lack of security as control can be provided from anywhere. Security flaws and inherent security problems with Internet communications are well-documented in the art. Another problem with this approach is the overhead required in transmissions, as complete identification information and security information may be required.

Yet another problem with Internet appliances is that it creates an increased need for network services. Each Internet appliance must have access to the Internet. This increased need for network service increases the cost to the end user. It also increases the volume of traffic over the Internet and increases the latency between when a command is issued and when a command is acted upon. In some methods of providing Internet appliances, communication always goes through a central location so that the information passing through the central location can be monitored, recorded, or stored in order to profile customers and generate additional information concerning product usage.

Thus the current trends in Internet appliance provide many problems, particularly from the viewpoint of a consumer that is interested in reducing or eliminating costs associated with additional services and is interested in maintaining some level of privacy.

Voice Control and Speech Recognition

Attempts have been made for voice control applications and speech recognition. One requirement of voice control applications is the need for high quality voice input. Without high quality voice input, additional processing may be required. Further, the performance, including accuracy and/or processing time of the speech recognition, suffers without high quality voice input. High quality voice input is problematic in today's environment as people are surrounded by numerous sounds in many different environments. Thus current voice control applications may not function properly when environmental noise can not be controlled.

The quality of the voice signal may suffer even more where the voice signal is transmitted. This degradation of sound quality is due to noise, fading and other problems. This is particularly true where a signal is transmitted longer distances or on noisy channels or where there is interference with other devices, or multipath inference.

Still another problem in voice control applications involves the volume required for the voice control application to operate. Currently, voice command information must be spoken at a volume that can be potentially overheard by others. Others may not want to hear these voice commands and may be annoyed by them. Similarly, one who is operating a voice control device may not want their instructions overheard by others.

Thus there is a need in voice control applications and speech recognition for an improved and higher quality voice input. There is a further need for devices using voice recognition in applications where voice information is transmitted. There is a further need for voice control devices that can be operated by a user who is speaking softly.

Targeted Information Messages and Advertising

Prior art attempts have been made to create targeted information messages and to provide advertising. Targeted information messages provide information, including advertising to those who may be interested in receiving such information and potentially relying on the information. Many problems remain. One of these problems relates to the limiting of information messages only to those who are interested in receiving the information message. For example, many consumers may find such advertising attempts to be obtrusive. Another problem in providing targeted information messages and advertising relates to targeting the message to the consumer who desires that information or otherwise finds it useful. A further problem is that current methods of providing targeted advertising use identification methods and tracking methods that may raise privacy concerns for consumers, as consumers may not want businesses to have complete access to all of their information or for businesses to otherwise be able to have such complete profiles identified with a particular consumer.

Product Information

When consumers make purchases, consumers generally like to be informed about the selections that are available and about what they are buying. Typical methods of providing this information include having a salesperson available to answer questions, providing brochures or other printed sales information, or placing sales information on the Internet. There are problems with these prior art methods. Consumers often regard salespersons as pushy or aggressive, and realize that salespersons may be trying to make a sale for reasons unrelated to the consumer's considerations in making a purchase. Consumers sometimes also regard salespersons as lacking knowledge concerning the products being sold. Consumers also recognize that there are cases where a salesperson actually provides misinformation concerning a product. Furthermore, providing adequate sales staff to explain products is not always an option.

The use of brochures and printed information is another approach of providing a consumer with desired information. This print or online information can be voluminous and a consumer may not want to read all of the information as much of it may not be relevant to the consumer's purchasing decision. Thus there is a need for providing information concerning products to the consumer in a manner that is unobtrusive and convenient.

Tracking

Many attempts have been made concerning apparatuses and methods related to tracking a user's location. Many such systems rely on satellite technologies such as GPS. Problems remain with these approaches. One problem relates to the accuracy and resolution which can be effected by various factors. This problem can be overcome, but to do so is costly. Another problem relates to using such systems indoors, where a GPS receiver may not be able to receive a GPS satellite signal. A further problem relates to the time needed for a GPS receiver to achieve synchronization in the initialization period. This time period can be minutes in length and is inconvenient, particularly where a signal is lost. An additional problem is the power requirements of a GPS receiver. Thus, there is a need to better track a person's location.

Therefore, it an object of the present invention to improve upon the state of the art.

It is a further object of the present invention to provide a communication and control system that is hands free.

It is a further object of the present invention to provide a communication system and method which limits electromagnetic interference.

It is a primary object of this invention to provide a communication system and method which limits radiation exposure.

It is a still further object of the present invention to provide a communication system and method which reduces energy consumption.

It is an additional object of the present invention to provide a communication system and method which provides for increased security.

Another object of the present invention is to provide an apparatus, system, and method of remote voice control.

It is yet another object of the present invention to provide an apparatus, system, and method of remote voice control that is convenient to users.

It is an additional object of the present invention to provide a communication system and method which provide improved sound quality.

A still further object of the present invention is to provide a communication system and method with reduced overhead.

Yet another object of the present invention is to provide greater reuse of frequency channels.

A still further object of the present invention is to provide a communication system and method for providing targeted informational messages and advertising.

A still further object of the present invention is to provide a communication system and method for providing targeted information messages and advertising without compromising a consumer's privacy.

Yet another object of the present invention is to provide an apparatus, system, and method for remote control that is secure.

A further objective of the present invention is to provide an apparatus for communication that is modular and/or configurable.

A still further object of the present invention is to provide an apparatus, system, and method for locating a user.

Yet another object of the present invention is to provide an apparatus, system, and method for monitoring biological conditions of a person.

Another object of the present invention is to provide a method and apparatus for providing information concerning products to consumers in a manner that is unobtrusive.

Yet another object of the present invention is to provide a method and apparatus for providing information concerning products to consumers in a manner that is convenient.

These, as well as other objects and features of the present invention, will be apparent from the following detailed description, claims, and accompanying drawings.

SUMMARY OF THE INVENTION

The invention provides hands-free transmission of voice and other information for voice communication and voice control. The invention provides for very low power communication devices. One device of the present invention, a personal unit, includes an earpiece that includes a bone conduction sensor and an air conduction sensor and a transmitter as well as additional circuitry that may include biological sensors, voice recognition components, and voice construction components. The quality of the voice processing is improved as the voice processing is contained within the earpiece. The low power nature of the devices is suitable for prolonged use in close contact with the body.

The invention provide for a local unit that is capable of communicating with one or more personal units or one or more other local units. The local units can provide additional components providing additional functionality, that can not be entirely contained within the earpiece. In addition, the local units can be used in voice control application. The local units receive voice information transmitted from the personal unit. The high quality voice information is especially suited for voice control applications.

The local units may communicate additional information to and from the personal unit, making the local units suitable for other applications, including tracking and security functions. A limited transmission range between the personal unit and local unit allow a location of a personal unit to be determined by the location of local units within range of the personal unit. Actions can be taken based upon whether a personal unit is in range of a particular local unit. The local units may also communicate with other networks such as wireless ethernet and cellular networks.

DETAILED DESCRIPTION OF AN EXEMPLARY EMBODIMENT

The present invention will now be described as it applies to an exemplary embodiment. It is not intended that the present invention be limited to the described embodiment. It is to be appreciated that the invention covers all modifications and alternatives which may be included within the spirit and scope of the invention.

Figure 1:
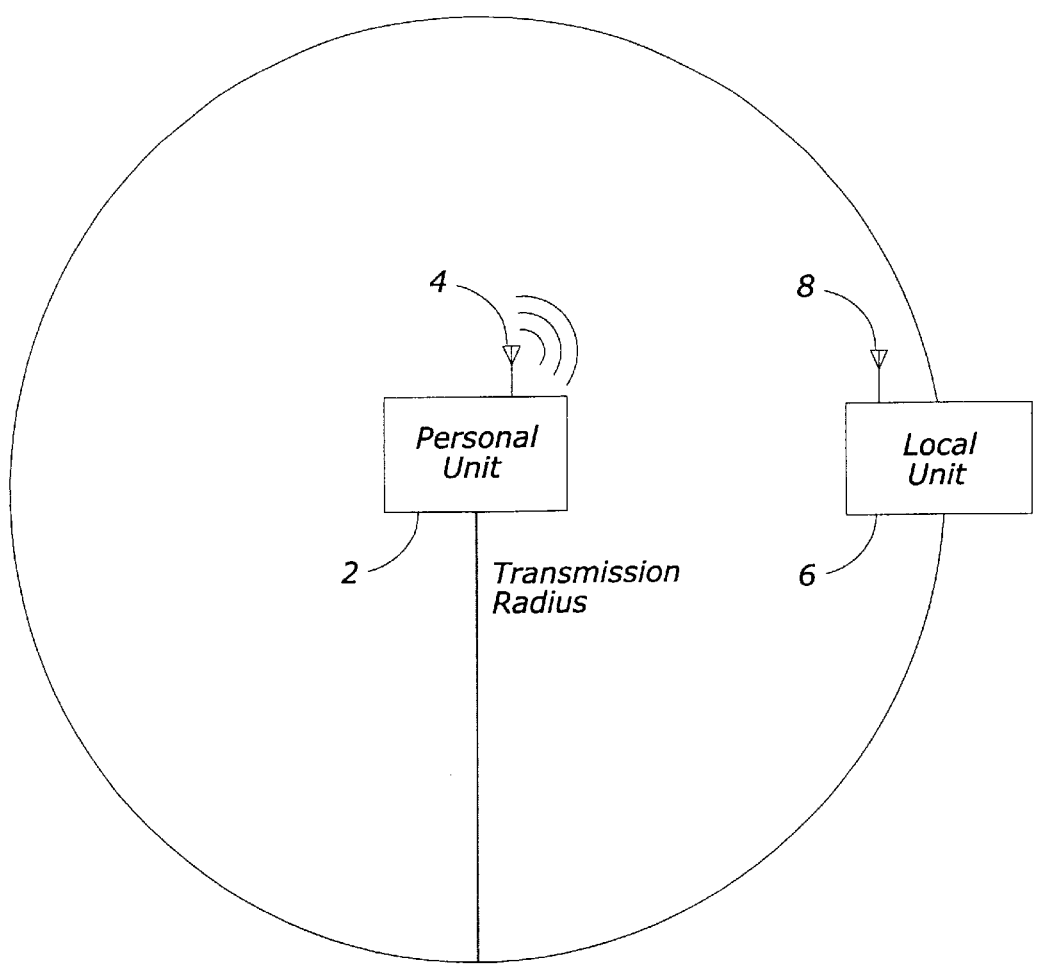
FIG. 1 is a schematic diagram illustrating a limited range transmission according to the present invention.

FIG. 1 is a block diagram of one embodiment of a method of communicating according to the present invention. A personal unit 2 with an antenna 4 is located within a transmission radius of a local unit 6 with an antenna 8. The personal unit is transmitting or receiving an electrical signal to and from the local unit 6. The personal unit 2 and the local unit 6 are configured such that a signal will attenuate so that it is only received at or inside the transmission radius, the transmission radius being predetermined. The power of the broadcast signal will depend on factors such as the frequency of the signal, the distance in which the signal should attenuate, and environmental conditions such as temperature and humidity and other factors such as are known in the art. The present invention contemplates that the broadcast signal may use any number of modulation schemes and may operate on a variety of frequencies. For example, the broadcast signal can be an FM signal operating at between 88 and 108 MHz such as may be used in FM radio and hearing aid devices, or could be GFSK operating in the 2.4–2.6 GHz band or any other type of modulation scheme or frequency such as is known in the art. Similarly, the signal can be broadcast as a spread spectrum signal at a frequency within the range of 902 MHz to 960 MHz. Other modulation schemes include, but are not limited to AM, QPSK, BPSK, FSK, and others. The present invention contemplates operation with any number of narrow band or wideband systems.

In a wideband systems, modulation schemes such as spread spectrum may be used. Spread spectrum is a type of modulation scheme that sacrifices bandwidth to gain signal-to-noise performance. Types of spread spectrum modulation include direct sequence, frequency-hopped, pulsed FM, or hybrid forms such as are well known in the art. In spread spectrum signals, the signal is spread out across a greater bandwidth than is actually required for transmission. Because the signal is spread out, a spread spectrum transmitter can transmit at a lower spectral power density than a narrowband transmitter.

The distance between the antenna 8 on the local unit 6 and the antenna 4 on the personal unit 2 is approximately 12 feet or less. The distance is selected in order to reduce the power necessary for the transmission, thus reducing or eliminating certain undesirable bioeffects that may be present in systems with a far greater transmission range. It is to be appreciated that this distance is within the normal hearing range for a typical voice conversation. For example, one decibel range for volume of a typical voice conversation is 50 to 60 decibels. It is to be appreciated that a regular voice conversation could be heard between the local unit 6 and the personal unit 2 if sound waves were transferred at this loudness. Here, however, radio signals are transferred instead of sound.

It is further to be understood, that the ultra-short range nature of the present invention permits very low power devices and very low power transmissions of the signal. For example, a personal unit may have a transmitted power of 1 mW or less. Another way to define the limited range of the present invention is through power density. Power density is a measure of the power radiated per area. The present invention contemplates low power for short distances with low power densities including power densities that are lower than 150 $\mu W/cm^2$ in order to prevent radiation exposure to users of the personal unit. The present invention further contemplates using directional antennas and shielding to further reduce radiation exposure. The precise transmitted power and power density may vary in accordance with the frequency band used, the modulation scheme used, the receiver sensitivity, and the precise range of distance selected, and other factors.

It is to be further understood that the low power device of the present invention has a very low specific absorption rate (SAR) in order to reduce the amount of radiation absorbed. It is to be appreciated, however, that specific absorption rate as presently calculated are not necessarily meaningful as the entire mass of a person is taken into account as opposed to a localized mass. This is of particular concern where an earpiece is used as the absorption will be in a localized vicinity (head region) instead of spread out across the entire body.

Figure 2:
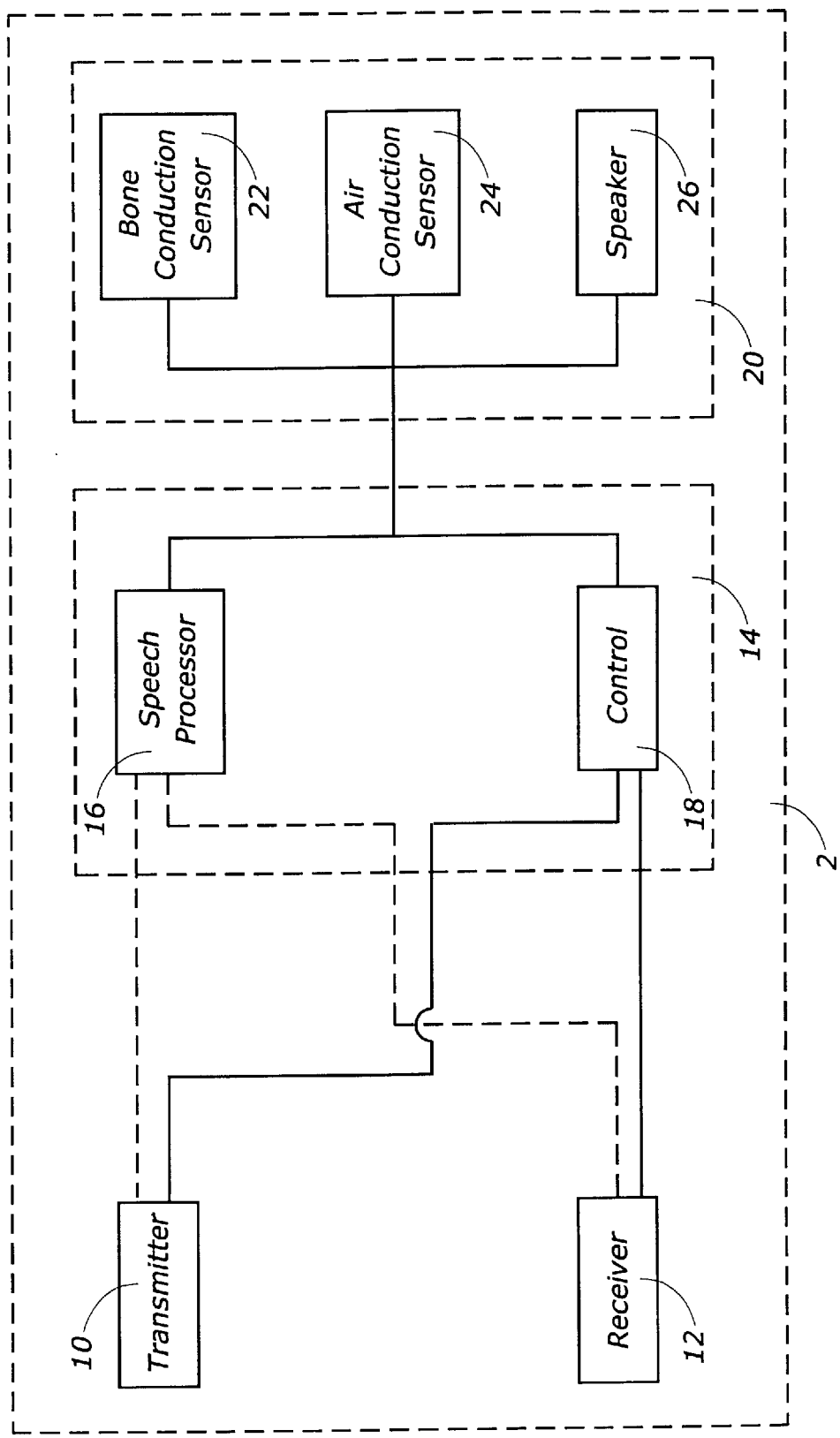
FIG. 2 is a block diagram illustrating an embodiment of a personal unit according to the present invention.

FIG. 2 shows one embodiment of the personal unit. The personal unit 2 includes a transmitter 10 and receiver 12. It is to be understood that the receiver may include an encoder and/or a modulator or other components that may be used to receive a signal transmitted over a channel. Similarly, the transmitter may include a decoder and/or a demodulator and other components that may be used to prepare a signal for transmission over a channel. It is to be further understood that the transmitter 10 and the receiver 12 can be combined in a transceiver that is capable of both receiving and sending. The transmitter 10 and the receiver 12 are connected to a processing unit 14. The processing unit may include a speech processor 16 and a control processor 18. The present invention contemplates that the same processor may be used both for the speech processor 16 and the control processor 18. The processor used may be a digital signal processor, a microprocessor, a microcontroller, an ASIC, an integrated circuit, a portion of an integrated circuit or other device that perform the required processing. When the processor is a digital signal processor, the processor may be a TMS320C5420 available from Texas Instruments, or other digital signal processor selected for its small size, low power requirements, processing capabilities as well as other features such as may be desirable for the particular application or other reasons. The processor 14 is electrically connected to a input/output (I/O) unit 20. The I/O unit 20 may include a bone conduction sensor 22, an air conduction sensor 24, and a speaker 26. The bone conduction sensor 22 and the air conduction sensor 24 are used to input pure voice sound information into the speech processor 16. The speech processor 16 can then either process and direct the voice sound information to transmitter 10, or the speech processor can process the voice sound information and send the result to control processor 18. This configuration in the personal unit 2 permits flexibility in the way that voice sound information is processed. For example, certain words or phrases can be received as voice sound information at the bone conduction sensor 22 and air conduction sensor 24 and then be processed by speech processor 16. Speech processor 16 can identify particular words or phrases such as words used in a command set. Thus, the commands or other identified words need not always be transmitted as voice sound information. Some of these particular words or phrases can be used for local control of the personal unit. For example, the command "turn off transmitter" could be identified by the speech processor 16 which is in electrical communication with the control processor 18. Thus, the control processor 18 could then turn off the transmitter. Similarly the control processor 18 could control the receiver, the volume levels, and other types of control.

Figure 3:
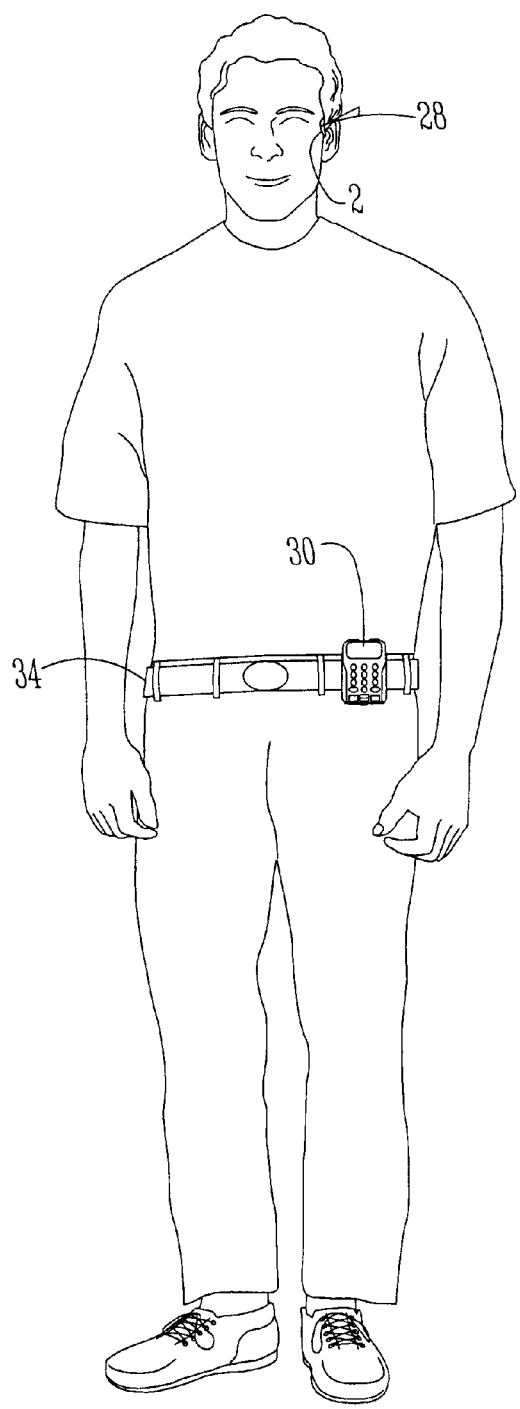
FIG. 3 is a pictorial view showing a user wearing a personal unit.

FIG. 3 shows another view of one embodiment of the invention. In FIG. 3, an earpiece 28 is worn by a user. The earpiece 28 can communicate with an auxiliary unit 30 which optionally may be worn on a belt 34. This configuration provides that additional input and output functions such as keypads and displays may be present on the auxiliary unit 30. Additionally, processing may be performed in whole or in part within the auxiliary unit 30. When configured in such a manner, reduced processing is required within the earpiece 28. The earpiece 28 is operatively connected with the auxiliary unit 30. This connection may be a wireless connection. The present invention also contemplates that the earpiece 28 may have all functions of a personal unit as previously described and the auxiliary unit 30 may then function as a local unit that provides I/O and other options.

Thus, the auxiliary unit 30 is optional to the local unit. The auxiliary unit 30 may provides additional input and output functions and also additional processing and expandability capabilities. The present invention contemplates that the auxiliary unit 30 may contain additional memory or storage, additional hardware devices or processors, and other additions.

For example, the present invention contemplates that the auxiliary unit 30 can contain additional memory or storage. The present invention contemplates that the storage can be magnetic, optical, or solid state memory. Standard flash memory cards can be used. The memory can be used for a number of purposes. In one embodiment, the memory can be used to store voice information. Thus, for example, voice information can be recorded to a flash memory card for later voice recognition purposes or to otherwise be transcribed. The present invention also contemplates that the voice information can be converted into other formats for storage. For example, voice recognition can be applied to the voice information within the auxiliary unit 30 and the resulting output can be stored as binary or text information in a standard file format. The memory can then be inserted into a computer or other device for retrieval.

The present invention also contemplates that the memory can be used to store software that is used by one or more processors in the auxiliary unit 30 or else the software is transmitted to the earpiece 28 and used by one or more processors in the earpiece 28. The software can provide additional functionality depending upon the context of the current user environment.

The present invention also contemplates that different hardware devices can be used in the auxiliary unit 30. The hardware devices may provide additional speech processing, voice recognition, security, recording or other functions. The auxiliary unit may also include a cellular telephone, or other communications device for communication across a second network.

By way of further example, the auxiliary unit 30 may contain an additional processor for translation purposes. For example, the input voice sound information can be processed and based on the result, the voice sound information can then be translated to a different language. This translated version can then be played for the user or else transmitted or both.

Figure 4:
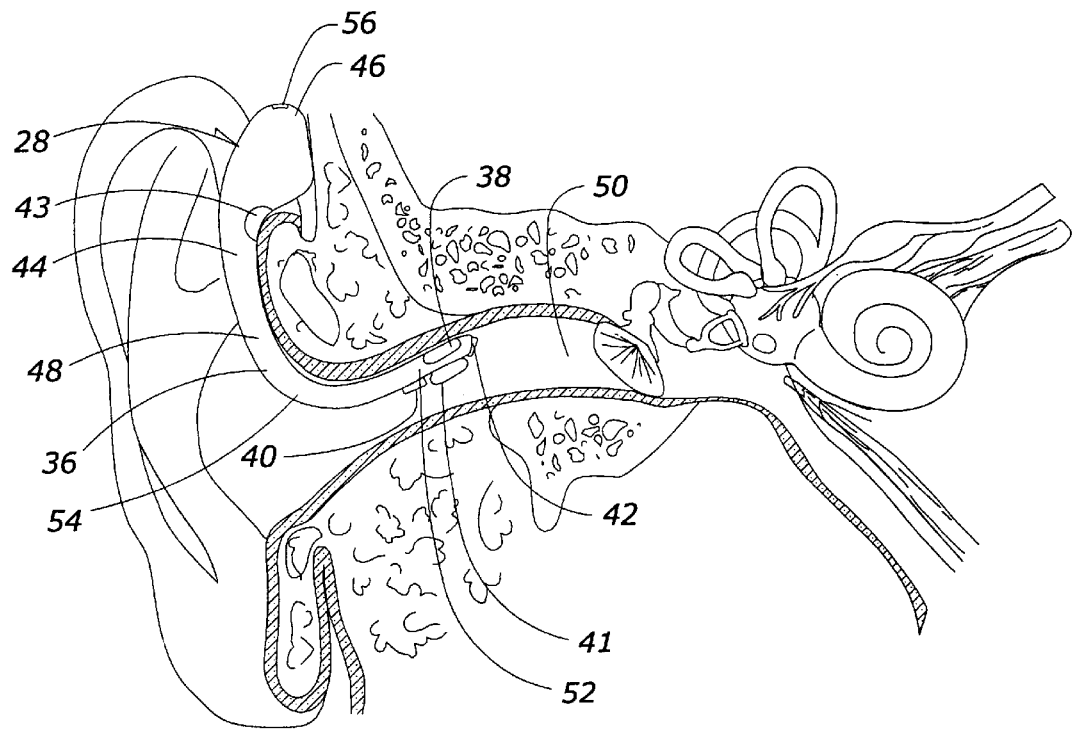
FIG. 4 is a perspective view of the earpiece unit of the personal unit.

The earpiece 28 may be the one described in U.S. Pat. No. 6,094,492 to Boesen, and is herein incorporated by reference. As best shown in FIG. 4, the earpiece 28 should be fit so that the bone conduction sensor 38 is in contact with a portion of the external auditory canal 50 near the bony-cartilaginous junction. It is preferred that the bone conduction sensor 38 rest against the posterior superior wall of the external auditory canal 50, with the flexible wire of the fitting portion 48 shaped to bias the bone conduction sensor 38 into position. Fitting the device and calibrations may be performed by the user or with the assistance of a physician or an audiologist/audiology technician.

The external ear canal portion 36 is formed so that the bone conduction sensor 38 may be inserted into the external auditory canal 50 of the user and nonexclusive contact against the posterior wall of the exterior auditory canal. The bone conduction sensor 38 is intended to pick up, as the voice signals, the vibrations of the upper wall of the external auditory canal 50 at the time of uttering the voice sounds. When the user utters the voice sounds, these sounds reach the mastoid bones. These sound vibrations in the external auditory canal portion which are in contact with the bone sensor 38 are then processed.

In addition to the bone conduction sensor 38, the external ear portion also includes an air conduction sensor or microphone 40. Like the bone conduction sensor 38, the air conduction sensor 40 is of standard construction and may be obtained from various hearing aid manufacturers. The air conduction sensor 40 may be an electret microphone or other air conduction sensor and preferably has a linear response over the frequency range of voice communications.

A resilient member 52 is preferably positioned between the air conduction sensor 40 and the bone conduction sensor 38 in such a manner that the external sound collected by the air conduction sensor 40 will not be transmitted to the bone conduction sensor 38. Additionally, the external ear canal portion 36 also includes a speaker 42. The speaker 42 is of a type well known in the art and common in the hearing aid industry. The speaker 42 is positioned directly in line with the tympanic membrane to facilitate clear transmissions while maintaining a low power output.

A circuit portion 54 transmits the electrical signals from both the bone conduction sensor 38 and the air conduction sensor 40 to a speech processor 16 which may be a part of circuit portion 54. The bone conduction sensor 38 and the air conduction sensor 40 are both tuned to receive frequencies within the range of audible human speech, approximately 50 to 8000 Hertz. The sensors preferably have a linear response in this range of frequency. The bone conduction sensor 38 may be, for example, a linear accelerometer.

The speech processor 16 may be of a conventional construction used in many hearing aids and employs a digital or analog processing scheme to package the voice signal for transmission across a wireless linkage. The speech processor 16 will be programmed to extract similarities from air and bone transmission, comparing the similarities in signal and then transmitting via a wireless linkage to receiving device.

The present invention contemplates that the circuit portion 54 including the speech processor 16 may both be a portion of the same integrated circuit. The present invention further contemplates all or a portion of the electronics of the personal unit may be realized in a system-on-chip (SOC) design.

Figure 5:
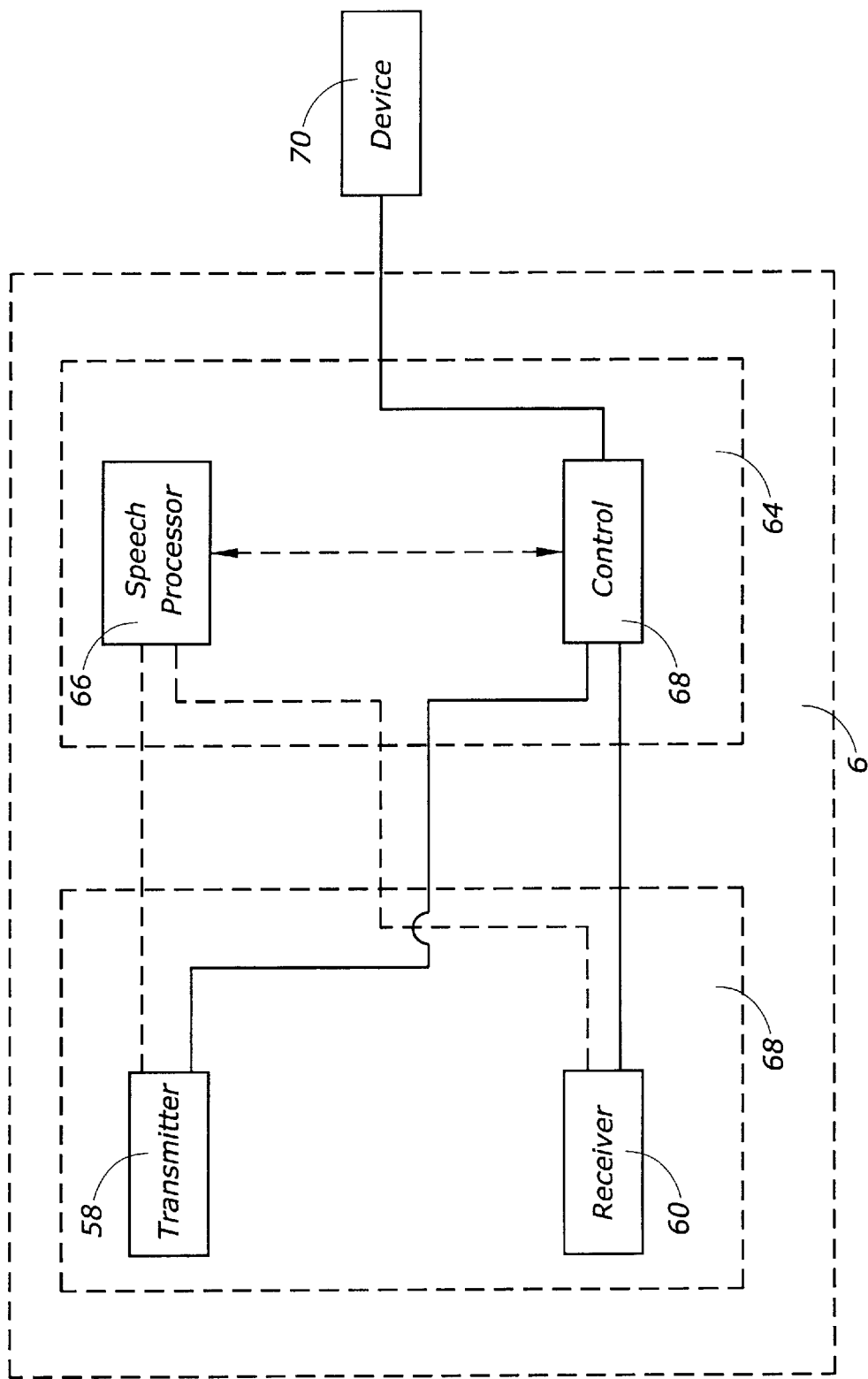
FIG. 5 is a block diagram of a local unit.

FIG. 5 shows one embodiment of the local transceiver unit. The local transceiver unit consists of a local transceiver 6 electrically connected to a control system 64 which is electrically connected to a device 70. The local unit 6 includes transceiver 68 consists of a transmitter 58 and the receiver 60. The transmitter 58 and receiver 60 are both connected to speech processor 66. The speech processor 66 is optionally connected to control unit 68 and the control unit 68 is electrically connected to a device 70.

The local unit 6 provides control over device 70. The present invention contemplates that the local unit 6 can be realized as a system-on-chip (SOC) design in order to further reduce size, cost, and power requirements and provide for easy integration of the local unit with the device 70. The present invention contemplates that the device 70 may have input and output functions. For example, the device 70 may have a keyboard or keypad, a touch screen, track ball, or mouse as well as a screen such as a LCD or other screen to display or set control information or identifying information concerning the device.

Figure 6:
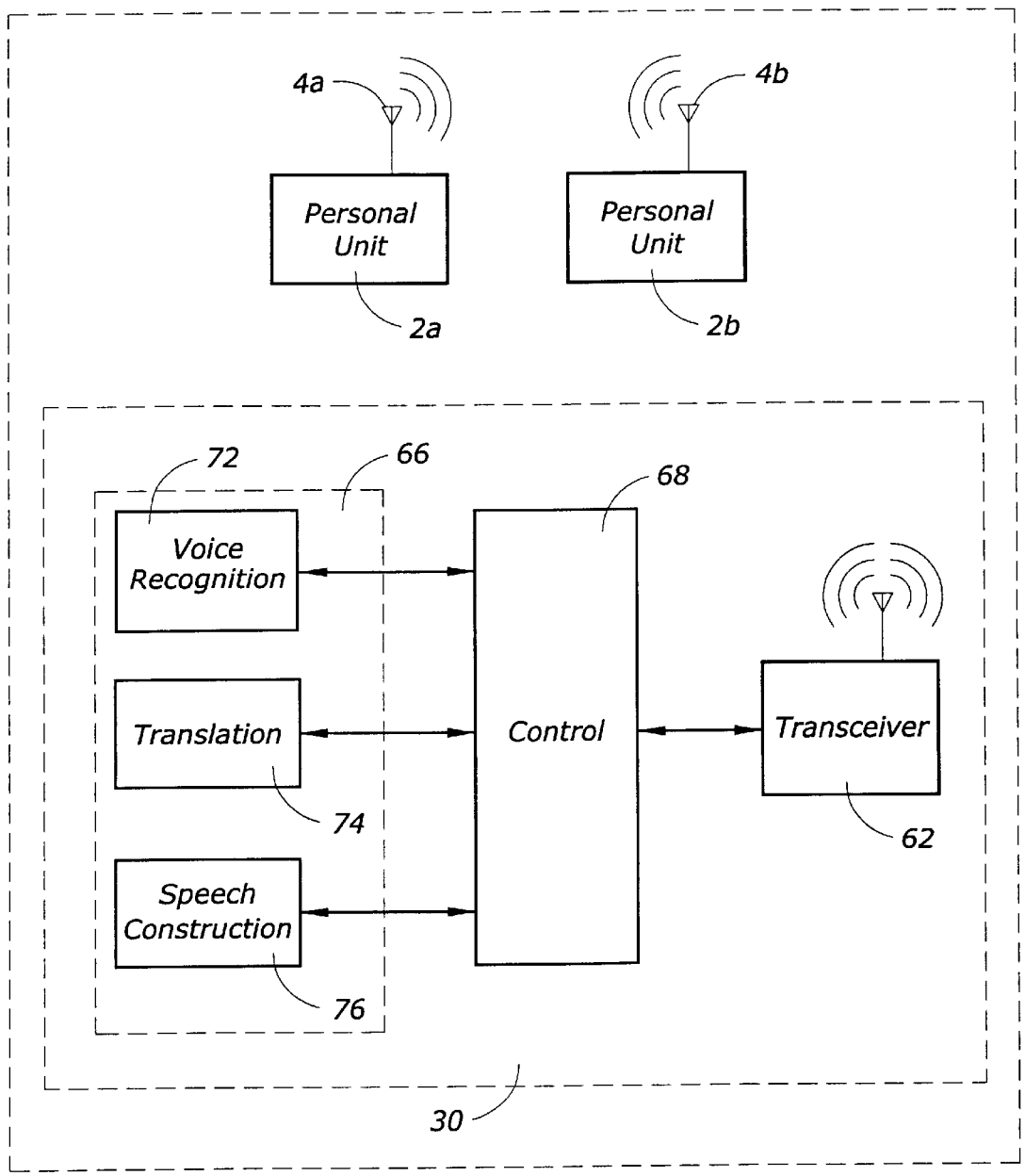
FIG. 6 is a representation of an auxiliary unit in communication with a personal unit.

FIG. 6 best shows a configuration used for translation purposes or selective listening purposes. The auxiliary unit 30 which can also be a local unit, provides voice recognition and translation services. The auxiliary unit 30 has transceiver 62 for sending and receiving information to personal unit 2a and 2b. A transceiver 62 is operatively connected to control unit 68. The control unit 68 is operatively connected to a voice recognition component 72, a translation component 74, and a speech construction component 76. Voice sound information is received by the transceiver 62 and then the control component 68 performs voice recognition functions on the voice sound information to convert the voice sound information into text information or other format that is conducive to translation, the output being received by the control component 68. The control component 68 then sends this information to translation component 74. The translation component 74 can then perform a translation of the information. For example the information can be English text information and the translation component can translate from English into a different language such as, but not limited to Japanese. The translation component 74 then sends the translated information to the control component 68. An optional speech construction component 76 is also available. Control component 68 can then send the translated information to the speech construction component 76. The speech construction component can then create voice sound information of the translated information that is sent to control component 68 and then transmitted by transceiver 62.

A personal unit 2a and/or a personal unit 2b will then receive the translated voice sound information and the user of personal unit 2 can then listen to the information as translated. The present invention contemplates purposes other than translation to and from different languages.

Figure 7:
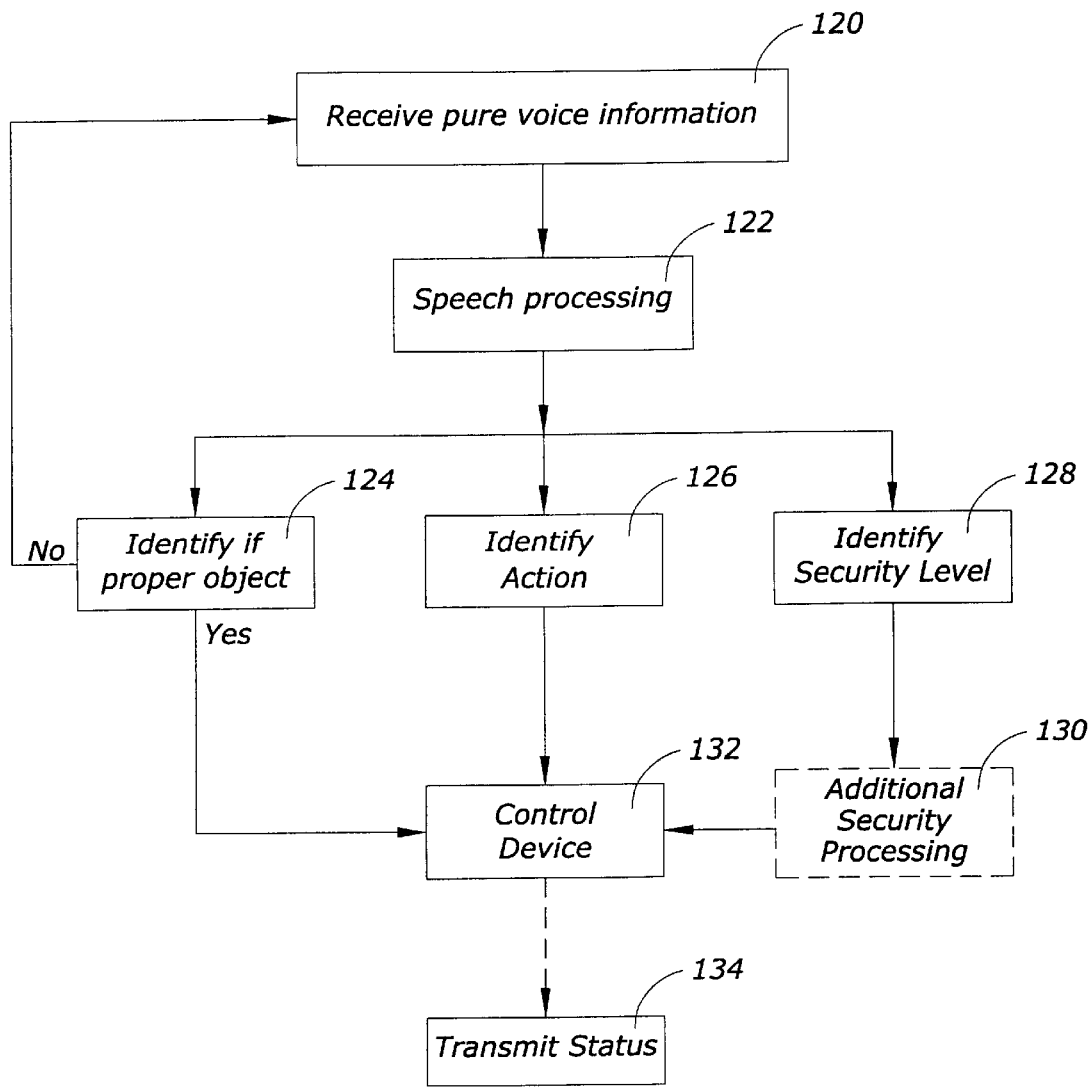
FIG. 7 is a block diagram of a method of processing pure voice information.

FIG. 7 describes a method of one embodiment of the present invention. In this embodiment, sound information, preferably pure voice information is received 120. Next, this sound information is processed for voice recognition purposes 122. In this embodiment, the speech processing 122 involves parsing the processed voice information to identify an object 124, an action 126, and an optional security level 128. Additional security processing 130 can be performed dependent upon the security required and the processing power available. Additional security processing 130 may include, but is not limited to identifying the speaker, or requiring a particular password or otherwise providing a response. Other types of voice processing and speech recognition techniques are known in the art and the present invention contemplates these and other variations.

Figure 8:
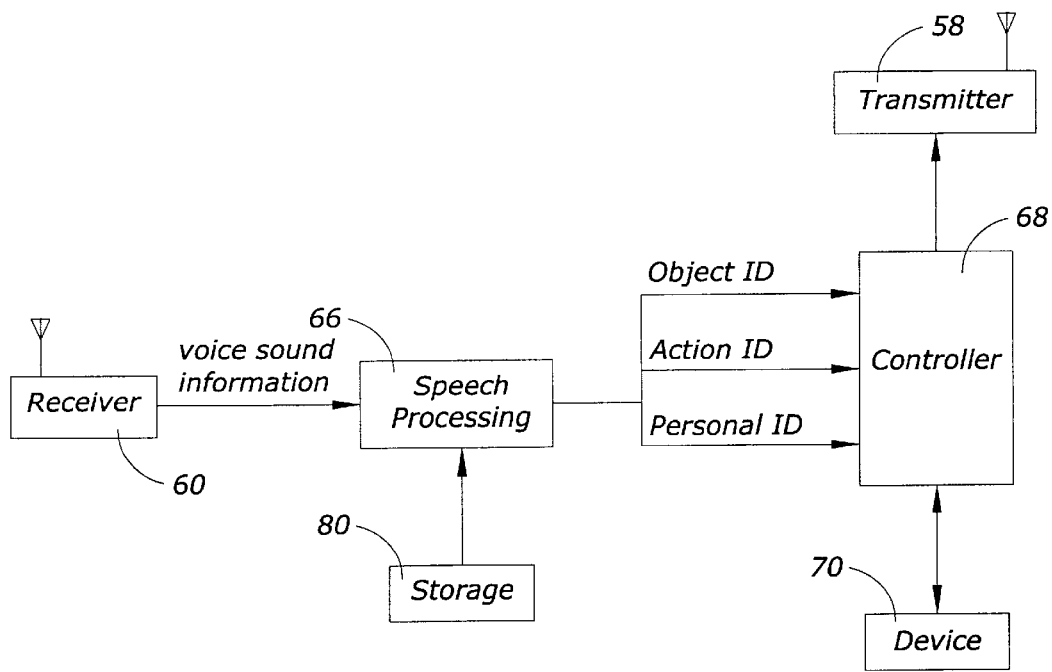
FIG. 8 is a block diagram of one embodiment of the personal transceiver unit.

As shown in FIG. 8, the device 70 that is electrically connected to local unit 6 is the device that is to be controlled. Each device 70, or a part of each device 70 is identified by the object. Thus certain words spoken by a user can indicate that a certain device 70 is to be controlled. This framing of words and phrases for identification purposes and other techniques for voice recognition are known in the art. This permits multiple devices to be within the transmitted range of a personal unit. This also permits multiple objects to be associated with a single device. This reflects the fact that a single device can have multiple controls and/or functions. Returning to FIG. 7, once device 70 is controlled in the control device step 132, the status can be transmitted 134. The status can include what action was taken on what object or other information that verifies the results of the communication, or the need for further action, or other status information such as the particular application may require.

FIG. 8 shows another embodiment of the invention. In this embodiment receiver 60 receives voice sound information that passes to a speech processing unit 66. Optionally, speech processing unit 66 has storage unit 80. Previous voice samples or voice characteristics may be stored in storage unit 80. Speech processing unit 66 is also in operative connection with controller 68. Controller 68 is connected to an optional transmitter 58. Controller 68 is connected to device 70. The present invention contemplates that device 70 can be any device capable of electronic control in any aspect. This includes without limitation, vehicles, appliances, toys, computers, communication devices, medical instrumentation, and other devices.

Figure 9:
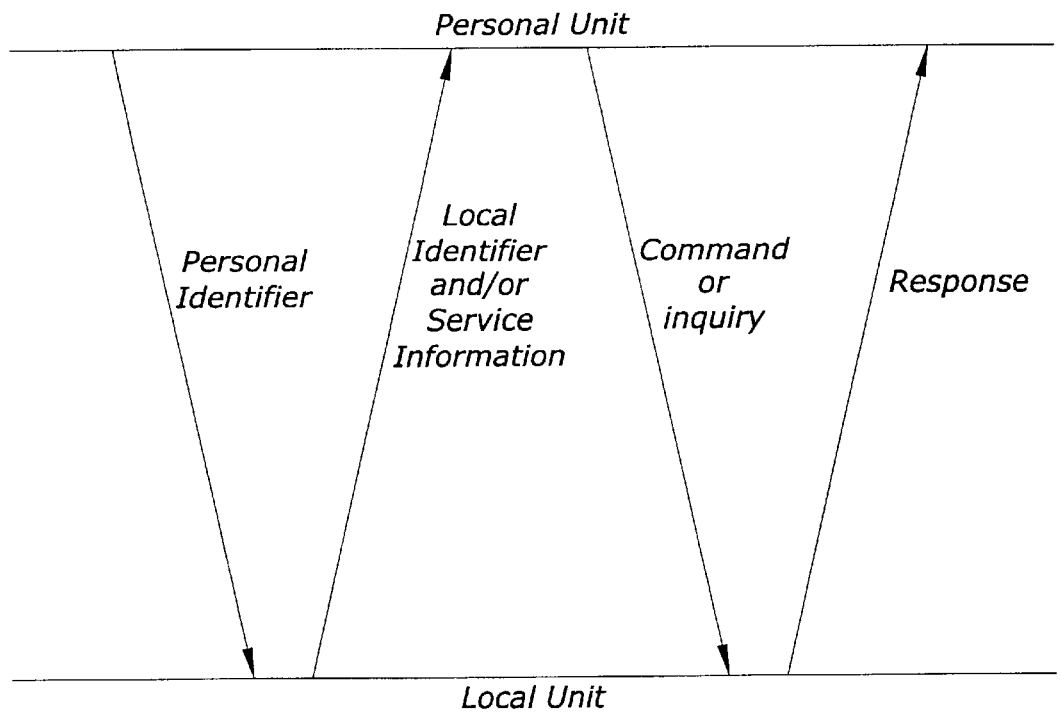
FIG. 9 is a diagrammatic representation of one embodiment of the communication protocol between the personal unit and the local unit.

FIG. 9 shows one embodiment of a communication protocol between a personal unit and a local unit. In this embodiment, a personal unit sends a personal identifier to a local unit. The local unit then responds to the personal unit by transmitting a local identifier and/or service information to the personal unit. The service information can include what services are available for a particular device or for a particular user. The personal unit can then either send a command or an inquiry to the local unit. A command can be an action for the local unit to perform. An inquiry can be a request for information from the local unit for status, additional service information or other information. Optionally, the local unit can then send a response to the personal unit. This response can contain, for example, the information requested, or whether an action was successful or unsuccessful.

The present invention contemplates numerous other protocols. For example, the local unit need not always respond with a local identifier, service information, or confirmation of a response. Similarly, the present invention contemplates that the personal identifier being sent may, but need not always uniquely identify the particular personal unit.

Figure 10:
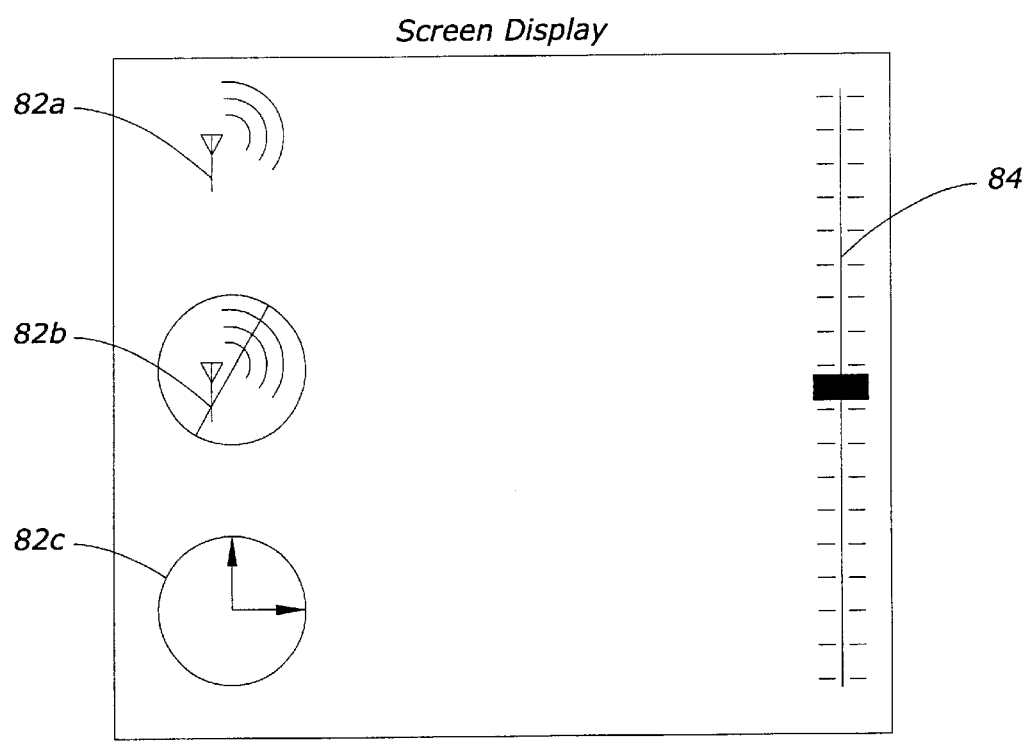
FIG. 10 is one embodiment of a screen display used in devices.

FIG. 10 shows one example of a display that can be incorporated into the design of a device that has a local unit. The screen display may be on a LCD, gas plasma, or other screen as are well known. The screen may be touch sensitive. On the screen are located various icons 82 which correlate to various functions related to the device or the local unit or personal unit. For example, 82a is representative of an icon that can be used to turn a transmitter, receiver, or transceiver of a local unit on. Similarly, icon 82b can be selected to turn the local unit off. Icon 82c can be used to access time functions of the local unit. Control 84 is a slider control that can be used for various purposes, including adjusting the volume associated with a local unit.

Figure 11:
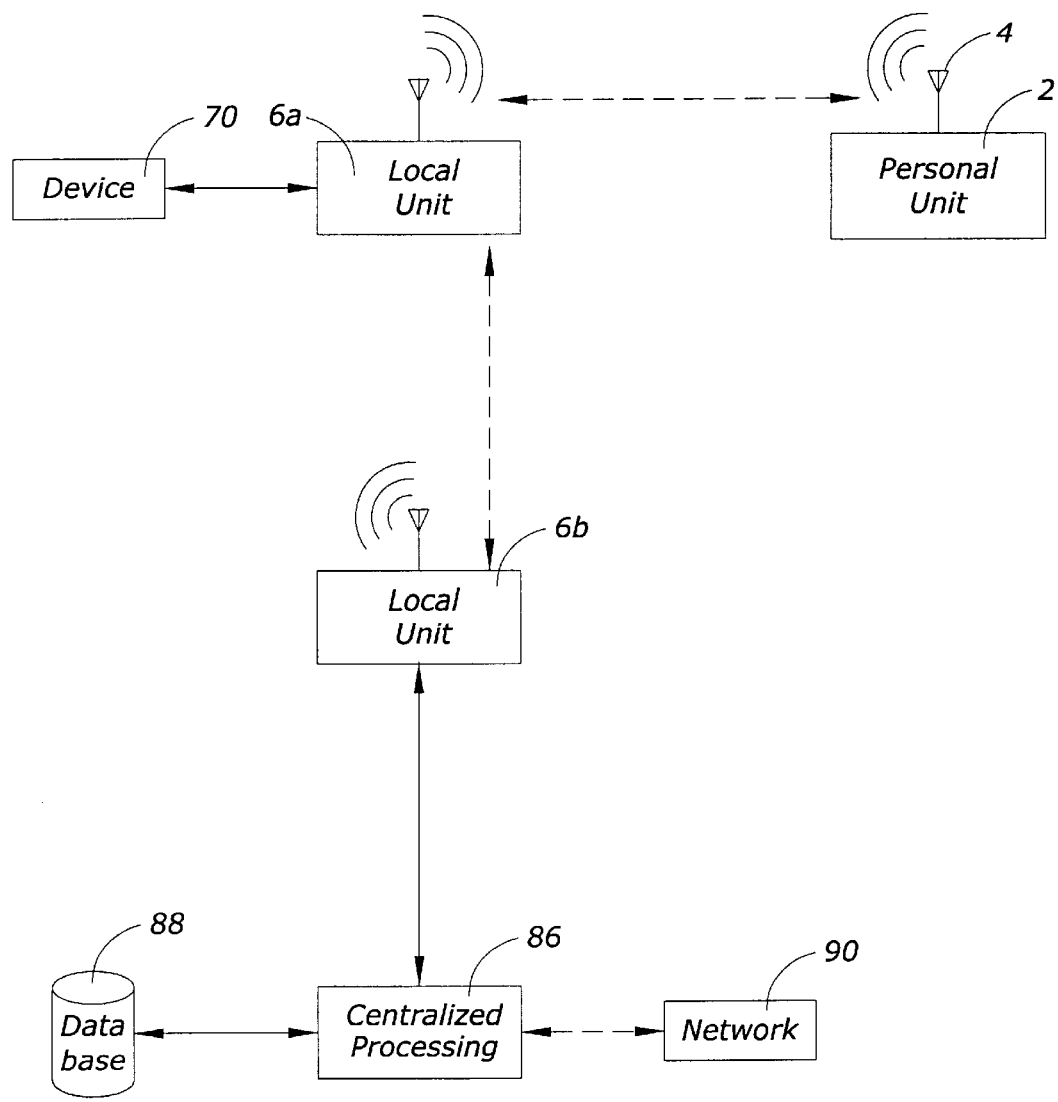
FIG. 11 is a block diagram of one embodiment of a local unit network.

FIG. 11 is one embodiment of a network involving both a personal unit 2 and multiple local units 6. In this particular embodiment, information can be requested by and transmitted to personal unit 2 from a local unit 6b, even though the local unit 6b is not in direct communication with the personal unit 2. Thus a personal unit 2 that is not within the transmission range of one local unit 6b may access that local unit through a second local unit 6a. Local unit 6b may also be connected to a centralized processing center 86 with database 88 and attached to network 90.

The present invention provides security in that the local unit 6 is in close physical proximity of the personal unit 2. Optionally, the information transmitted by the personal unit 2 can be determined by the user. Thus a personal unit 2 can control a local unit 6 without needing use of the network, yet can still access information provided over a network if desired.

In another embodiment of the present invention additional security is provided to various applications. One example, of a specific application of this aspect of the invention is in automotive security. Consumers desire that their vehicles be safe from thieves and vandals, but at the same time, do not want to be inconvenienced by having to lock and unlock cars and turn on and turn off car alarms.

In this specific embodiment, additional security and convenience can be provided by one embodiment of the present invention. In this embodiment a local unit is located on a car or other vehicle. The local unit may include a keypad, keyboard, and screen display if desirable so that the local unit may be programmed manually as well as by voice.

In this and other secure applications, voice recognition and voice identification or fingerprinting functions are located within the local unit. The voice recognition functions may be either hardware or software implementations or combinations of both. The present invention contemplates that these functions may be contained on integrated circuits, or as software in processors such as, but not limited to, microcontrollers, microprocessors and digital signal processors. These functions may be incorporated into ASICs, or these functions may be incorporated into a system-on-chip (SOC) with other functions of the local unit. Voice recognition integrated circuits and voice recognition software are known in the art.

As the local unit has voice identifying functions, a personal unit can transmit voice. sound information to the local unit and the local unit can apply voice identification or recognition functions to the voice sound information. Thus, voice sound information of a user can be used to control functions such as locking and unlocking a car if: (1) the local unit is within transmission range of the personal unit and (2) the voice sound information transmitted from the personal unit to the local unit matches that of the user's preprogrammed voice. The present invention contemplates additional levels and layers of security, such as the information transmitted, including the voice sound information, may be encrypted or scrambled and other security measures may be applied such as are well known.

In another embodiment of the present invention, location tracking is provided. It is to be understood that location tracking can serve multiple purposes. For example, but without limitation, location tracking can provide additional security, convenience, and seamless user operation.

As best shown in FIG. 11, multiple local units 6 can be within close proximity to each other. Identifying information, from a personal unit 2 can then be transmitted from a first local unit to a second local unit. The first and/or second local unit can then be attached to a central computer or otherwise centralized processing device. Centralized processing device 86 can locate the position of a personal unit user by determining which local units are receiving identifying signals from the personal unit. Thus a person can be located based on the location of the personal unit. Because of the short range transmission of the personal unit, the position can be determined based upon the known position of each local unit that is receiving an identifying signal from the personal unit.

The present invention contemplates that some actions can be taken automatically based upon the proximity or location of the personal unit 2 to a local unit 6. In the simplest case, action can be taken when a personal unit 2 enters or exits the range of a local unit 6. This range is preferably around 12 feet, but may be less as needed for the specific environment. For example, a car door can lock once a personal unit 2 attached to a person leaves the range of a local unit 6 located within the car. Similarly, the car door can unlock once the personal unit 2 re-enters the range. The present invention contemplates providing this functionality in conjunction with a timing device or mechanism that may be implemented in hardware, but preferably by software in the control component of the local unit. The timing device is used such that the action occurs once the personal unit has been out of range for a given time, or once the personal unit has been within the range for a given amount of time. This mode of operation for the present invention increases the convenience to the user, providing seamless operation.

The present invention also contemplates that the timing requirements can be imposed in order to improve the security of the invention. This is due to the necessity that the identifying signal must be maintained for a given amount of time and within a short range. Thus, where the identifying signal is encrypted, and an unauthorized user attempts to scan through a number of identifying signals, the time to do so increases as each identifying signal being scanned must be maintained for a longer time period.

The invention further contemplates that location tracking can be used to determine the processing capabilities of a personal unit. For example, based on the location of a personal unit, different software can be loaded or unloaded in the speech processor or control component. This reduces the storage requirements of the personal unit 2 and may serve to reduce the size of personal unit 2.

Figure 12:
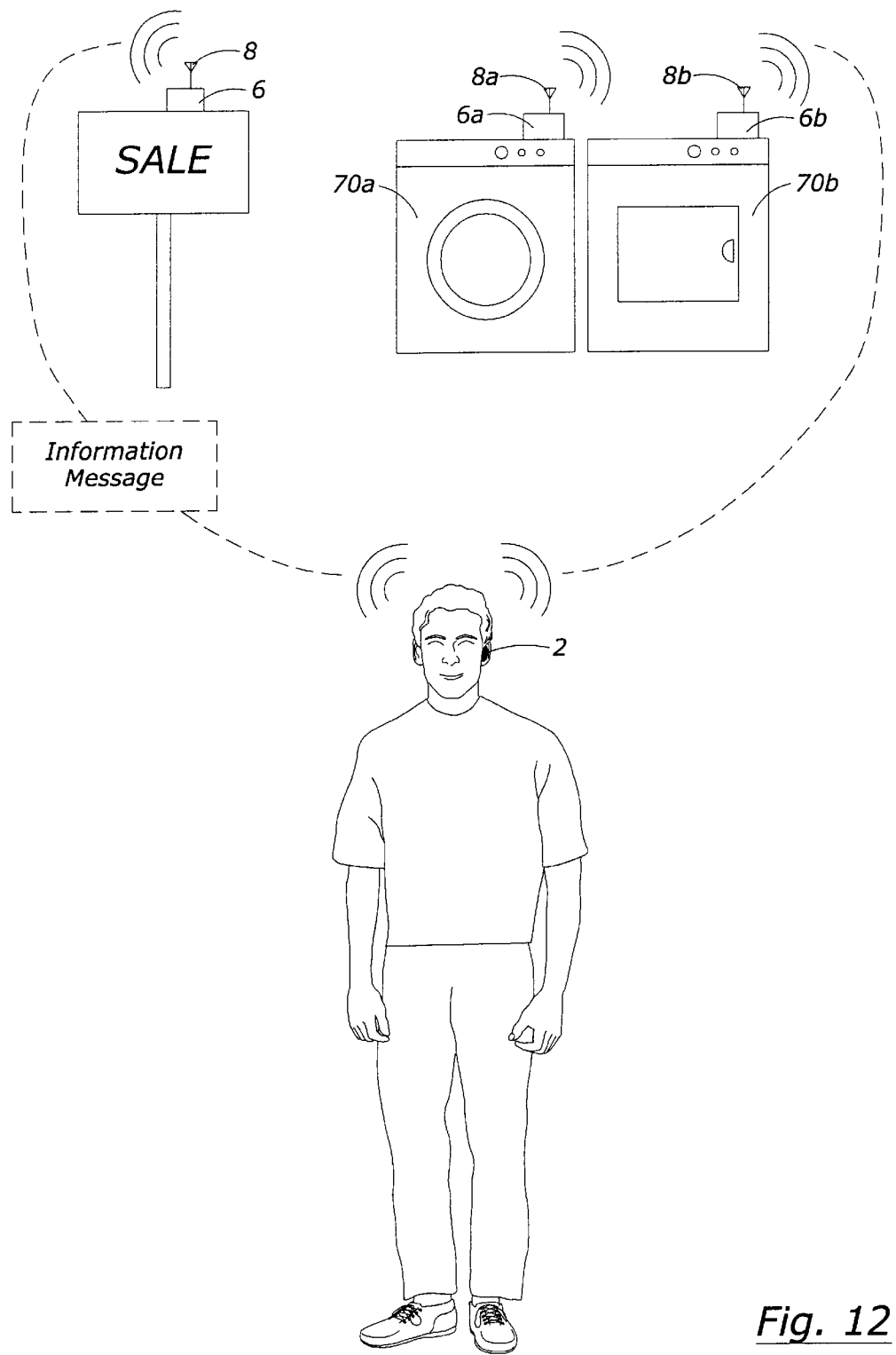
FIG. 12 is a pictorial representation of one embodiment used to provide information.

In one embodiment of the present invention, as best shown in FIG. 12, the invention provides targeted information messages and advertising. Information messages and advertising are broadcast by a local unit 6 to one or more personal units 2. Due to the short range of the transmission, only those personal units within the transmission radius can receive the message.

Local units 6 can be placed in stores such as department stores. Local units with very short transmission radii can be placed next to particular items or types of items. The transmission radii can be a distance in which an ordinary conversation could take place, such distance varying depending upon the amount of open space in the store and other factors. For example, a local unit can be used next to a display for an on-sale item. The local unit 6 then periodically transmits a message concerning the sale item to each personal unit 2. Due to the restricted transmission radius, only personal units within the transmission range will receive the message. For example, the transmission range can be set very short so that only those within a 12 foot or smaller radius would receive the broadcast. Those who are out of range would likely not be interested in the message as they are not in the localized vicinity of the sale item. Thus these people are never bothered by an unwanted message. Other distances are contemplated. The distance can be determined based upon the amount of traffic, and how close a person is to a local unit before it is reasonable to assume that they are interested in the associated display.

The message may contain an identifier as well. The identifier can identify the type of message or contents of the message. In addition, the personal unit can be set to play or disregard the particular message and/or the particular type or category of message. Thus, a personal unit can determine whether to listen to or ignore a message based on its associated identifier. Optionally, a personal unit can perform additional processing or control based on the particular message. For example, certain messages may be played, but at reduced volume. The present invention contemplates other types of processing. For example, certain messages may be played, but only on the occurrence or nonoccurrence of other events.

As the advertising message has an identifier associated with it, the personal unit user is permitted to opt-in or opt-out as to whether certain informational or advertising messages are received and played.

The local unit 6, can optionally only have a transmitter and not a receiver or else the transmitter can operate in a transmission only mode. This mode of operation has several advantages. First, it can result in a less costly local unit if a receiver is not required. Second, it provides protection and comfort to a consumer who can feel secure with this type of technology as personal or private information concerning the consumer is not collected or recorded.

The present invention also contemplates that the personal unit 2 may also transmit information to local unit that requests particular information. This information may be voice sound information. This information may also include an identifier of the personal unit 2, and the local unit 6 can determine what information to transmit based on the identifier and optionally, as shown in FIG. 11, information contained in a database 88 that is accessible by the local unit 6.

The present invention also contemplates that local unit 6 may be located within a device such as 70a or 70b. As previously, explained, device 70 may already have a local unit installed for control purposes. Thus the local unit is programmed to provide information messages concerning its operation within the store thus that a consumer with personal unit 2 can listen to the information he or she requests. Thus a sales person is not necessary to provide this information and the consumer receives greater assurance that the information is correct and needs only listen to information that is requested or desired.

Yet another embodiment of the present invention relates to biomedical instrumentation. In this embodiment, personal unit 2 also includes biosensors. As shown in FIG. 4, biosensors such as, but not limited to a pulse oximeter 43 and a body temperature sensor 41 can be used. Biosensors may be located within earpiece 28 or are connected to auxiliary unit 30. When an auxiliary unit is used, biopotential sensing devices such as, but not limited to electrocardiographs (ECG), pulse rate sensors, and oximeters may be used. These biosensors produce information. The information can be converted into voice sound information at the personal unit to provide warnings or other information to the person wearing the personal unit. This conversion takes place with a voice construction component such as are used in text-to-voice applications and as is otherwise known in the art. The present invention contemplates that this voice construction component may be implemented in hardware as well as in software. The present invention contemplates that a processor, including a digital signal processor, may perform this and other functions. The present invention also contemplates that the voice construction component may be a implemented as an integrated circuit or a portion thereof. The present invention further contemplates other variations such as are well known in the art.

The information may also be transmitted to local units which may also produce voice sound information.

This system is suitable for a hospital setting. Due to the short range signal being used, any potential for electromagnetic interference with medical devices and equipment is reduced or eliminated. The present invention contemplates that the sensors used are configurable in that different sensors may be used depending on the needs of a person.

Figure 13:
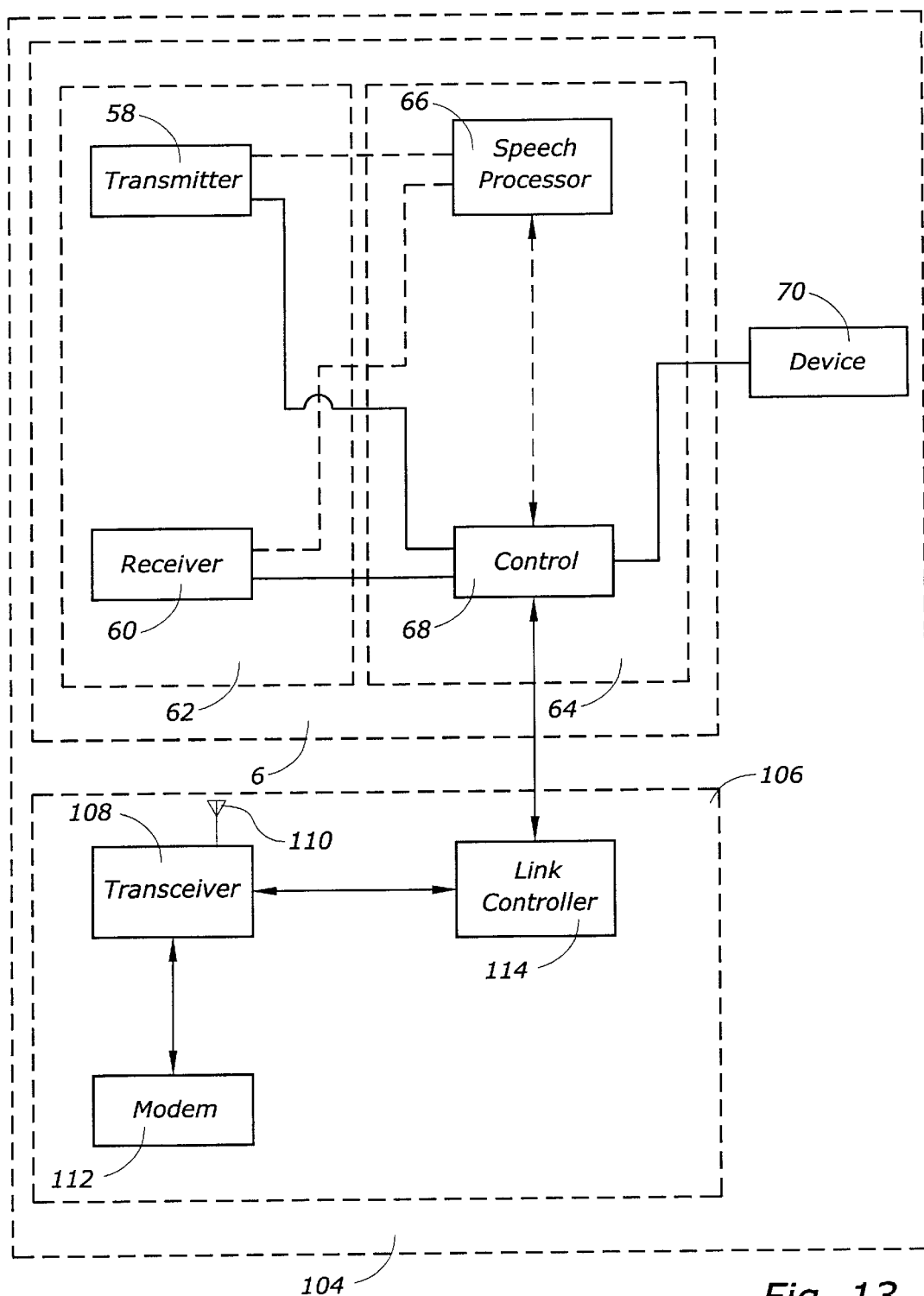
FIG. 13 is a block diagram of another network embodiment of the present invention.
Figure 14:
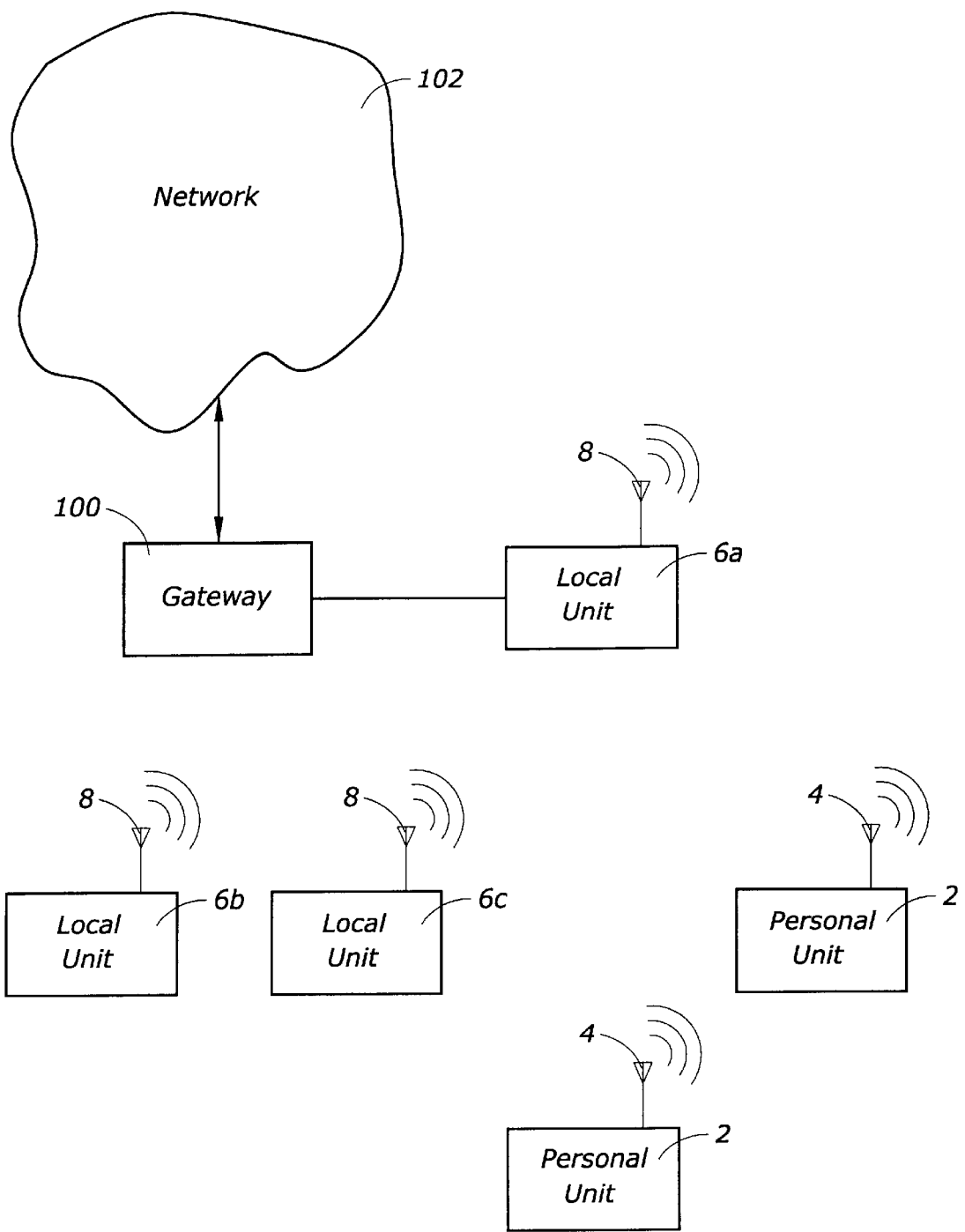
FIG. 14 is a block diagram of another network embodiment using a gateway.

The present invention contemplates that it may be used in conjunction with other networks, including various networks based on the IEEE 802.11 standard, BLUETOOTH™ networks, and other networks as may be known in the art. In FIG. 13, local unit 6 has a control unit 68 that is electrically connected to a network gateway 106. The network gateway may include a transceiver 108 with antenna 110, a modem 112, and a link controller 114. The link controller communicates with the control unit 68 such that information may be received or transmitted over either network. Thus the present invention contemplates that a network of local units and personal units may interface with other networks. This permits the longer range capabilities and high bandwidth capabilities of the other networks to be used, but at the same time, the ultra short range, radiation exposure reduced personal units of the present invention may be used to provide the intended benefits. FIG. 14 shows a network example where the network interfaced to is a BLUETOOTH™ or other, although the present invention contemplates that other wireless networks may be used. The interface to the network is through a gateway 100 where the gateway 100 is interfaced to a local unit 6a. Local unit 6a, attached to gateway 100, may be in communication with local unit 6a and/or local unit 6b, provided that local unit 6a is within range of the other local units. In addition, local unit 6a may be in communication with one or more personal units 2 when the personal units 2 are in range of local unit 6a. Thus a personal unit 2 or another local unit 6 may send and receive information intended for network 102 through local unit 6a and its gateway 100. Thus the present invention permits interoperability with other types of network, for various purposes.

A general description of the present invention as well as a preferred embodiment of the present invention has been set forth above. Those skilled in the art to which the present invention pertains will recognize and be able to practice additional variations in the apparatus, methods, and systems described and disclosed which fall within the broad teachings of this invention. Accordingly, all such modifications and additions are deemed to be within the scope of the invention.

What is claimed is:

1. A system for voice sound communicated control comprising:
   an earpiece adapted to be inserted into the external auditory canal of a user and having a bone conduction sensor being adapted to sense bone conductive vibrations in the external auditory canal and an air conduction sensor being adapted to sense air vibrations, and a processor electronically connected to the bone conduction sensor and the air conduction sensor and adapted to provide a voice sound signal;
   a local unit comprising:
   (1) a receiver for wirelessly receiving transmitted voice sound information over a distance;
   (2) a speech processing unit for processing the received voice sound information;
   (3) a control unit electrically connected to the speech processing unit for receiving the processed voice sound information;

(4) a device, wherein the device is electrically connected to the control unit and the control unit controls the device based on the voice sound information;

the earpiece in operative communication with the local unit.

2. The system of claim 1 wherein the speech processing unit includes a voice recognition component.

3. The system of claim 1 wherein the speech processing unit includes a voice identification component.

4. The system of claim 1 where in the speech processing unit includes a voice recognition component and a translation component.

5. The system of claim 1 wherein the receiver is a frequency modulation receiver.

6. The system of claim 1 wherein the receiver operates at a frequency within the 88–108 MHz band.

7. The system of claim 1 wherein the receiver operates at a frequency of approximately 2450.0 MHz.

8. The system of claim 1 wherein the receiver is a spread spectrum receiver.

9. The system of claim 1 wherein the receiver operates at a frequency within the range of 902 MHz to 960 MHz.

10. The system of claim 1 wherein the control unit is selected from the set consisting of a processor, a digital signal processor, a microcontroller, a microprocessor, and an integrated circuit.

11. The system of claim 1 wherein the control unit and the speech processing unit are located on the same chip.

12. The system of claim 1 wherein the device is selected from the set consisting of an appliance, a vehicle, a store display, and an electronic consumer device.

13. The system of claim 1 wherein the distance is less than approximately 30 feet.

14. The local unit of claim 1 wherein the distance is less than approximately 12 feet.

15. The system of claim 1 wherein the distance is within the normal hearing range of normal voice communications.

16. The system of claim 1 further having a keypad in operative connection with the control unit.

17. The system of claim 1 further having a touch screen in operative connection with the control unit.

18. The system of claim 1 further having a display in operative connection with the control unit.

19. A new personal unit for personal communications comprising:

an earpiece adapted to be inserted into the external auditory canal of a user and having a bone conduction sensor being adapted to sense a portion of the external auditory canal adjacent the mastoid bone to convert bone conductive voice vibrations of the voice sound information of the user into electrical signals and an air conduction sensor being adapted to convert air vibrations of the voice sound information into electrical signals, a speech processor disposed within the earpiece, the speech processor being adapted to receive the electrical signals from the bone conduction sensor and the air conduction sensor and produce a voice sound signal; and a voice recognition component in communication with the speech processor, the voice recognition component receiving the voice sound signal, applying voice recognition to recognize a message, and outputting a signal based on the message.

20. The personal unit of claim 19 wherein the voice recognition component is selected from the set consisting of software, hardware, firmware, and an integrated circuit, a portion of a SOC.

21. The personal unit of claim 19 wherein the voice recognition component is a portion of the speech processor.

22. The personal unit of claim 19 wherein the one or more components of the personal unit is contained on a SOC.

23. The personal unit of claim 19 wherein the air conduction sensor is an electret microphone.

24. The personal unit of claim 19 wherein the bone conduction sensor is a linear accelerometer.

25. The personal unit of claim 19 further comprising a transmitter for transmitting the voice sound signal.

26. The personal unit of claim 25 wherein the transmitter transmits at a power of less than approximately 1 mW.

27. The personal unit of claim 25 wherein the transmitter transmits at a power of less than approximately 0.5 mW.

28. The personal unit of claim 25 wherein the transmitter has a power density of less than approximately 150 $\mu$W/cm$^2$.

29. The personal unit of claim 25 wherein the transmitter has a power density of less than approximately 75 $\mu$W/cm$^2$.

30. A new system for remote voice control comprising:

a voice sound transmitting unit including an earpiece adapted to be inserted into the external auditory canal of a user and having a bone conduction sensor being adapted to sense a portion of the external auditory canal adjacent the mastoid bone to convert bone conductive voice vibrations of the voice sound information of the user into electrical signals and an air conduction sensor being adapted to convert air vibrations of the voice sound information into electrical signals, a signal processor disposed within the earpiece to receive the electrical signals from the bone conduction sensor and air conduction sensor to produce a true voice signal and to produce an identifying signal that identifies the voice sound transmitting unit or an operator of the voice sound transmitting unit, a transmitter operatively connected with the signal processor to receive the voice sound signal and the identifying signal for transmission; and a receiver unit including a receiver capable of receiving the voice sound signal and the identifying signal and a control unit electrically connected to the receiver for processing the voice sound signal into control information.

31. The system of claim 30 wherein the receiver unit and the transmitting unit are located within 30 feet of each other.

32. The system of claim 30 wherein the receiver unit and the transmitting unit are located within 12 feet of each other.

33. The system of claim 30 wherein the transmitting unit has a transmitting power of less than approximately 1 mW.

34. The system of claim 30 wherein the transmitting unit has a transmitting power of less than approximately 0.5 mW.

35. The system of claim 30 wherein the transmitting unit has a power density of less than approximately 150 $\mu$W/cm2.

36. The system of claim 30 wherein the transmitting unit has a power density of less than approximately 75 $\mu$W/cm2.

37. A system for personal communications comprising:

an earpiece adapted to be inserted into the external auditory canal of a user and having a bone conduction sensor being adapted to sense bone conductive vibrations in the external auditory canal and an air conduction sensor being adapted to sense air vibrations, and a processor electronically connected to the bone conduction sensor and the air conduction sensor and adapted to provide a voice sound signal;

a local unit comprising:

(1) a receiver for receiving voice sound information;

(2) a voice recognition component in communication with the receiver for processing the voice sound information and producing an output;

(3) a device;

(4) a control unit in communication with the voice recognition component and the device, the control unit controlling the device based on the output of the voice recognition component;

the earpiece in communication with the local unit.

38. The system of claim 37 wherein the receiver demodulates a FM signal.

39. The system of claim 37 wherein the receiver operates at a frequency approximately within the range of 88 MHz to 108 MHz.

40. The system of claim 37 wherein the receiver operates at a frequency of approximately 2450 MHz.

41. The system of claim 37 wherein the receiver operates at a frequency within the range of 902 MHz to 960 MHz.

42. The system of claim 37 wherein the voice recognition component, receiver, and control unit are housed in the same integrated circuit.

43. The system of claim 37 further comprising a transmitter.

44. The system of claim 43 wherein the transmitter has a power output of less than approximately 1 mW.

45. The system of claim 43 wherein the transmitter has a power output of less than approximately 0.5 mW.

46. The system of claim 43 wherein the transmitter has a limited range of transmission of approximately 30 feet.

47. The local unit of claim 43 wherein the transmitter has a limited range of transmission of approximately 12 feet.

48. The system of claim 43 wherein the transmitter has a power density of less than approximately 150 $\mu$W/cm2.

49. The system of claim 43 wherein the transmitter has a power density of less than approximately 75 $\mu$W/cm2.

* * * * *